June 14, 1960  C. L. LOVERCHECK  2,940,583
CONVEYOR AND ACTUATING DEVICE THEREFOR
Filed March 19, 1956  3 Sheets-Sheet 1

INVENTOR.
Charles L. Lovercheck

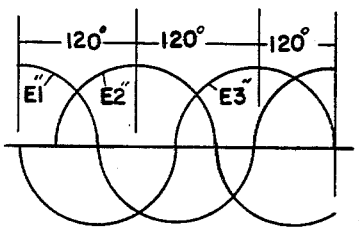
FIG 3
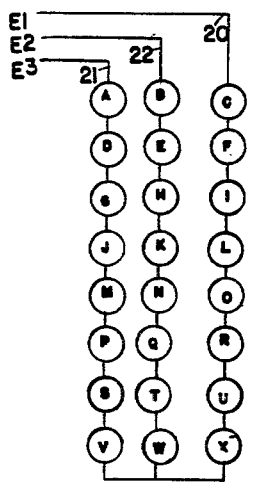
FIG 4
FIG 5
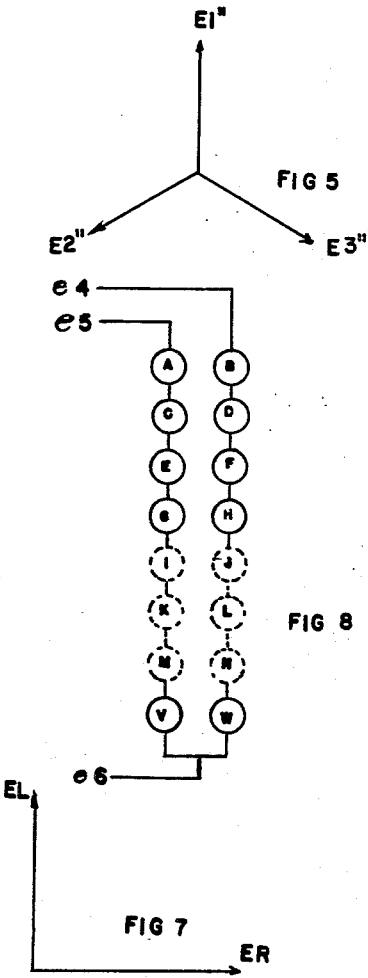
FIG 8
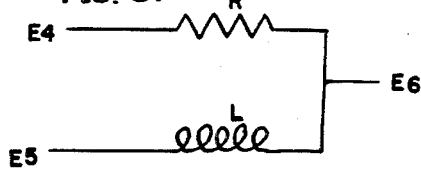
FIG. 6.
FIG 7
FIG 9
FIG 10
INVENTOR.
Charles L. Lovercheck June 14, 1960 C. L. LOVERCHECK 2,940,583
CONVEYOR AND ACTUATING DEVICE THEREFOR
Filed March 19, 1956 3 Sheets-Sheet 3

INVENTOR.
Charles L. Lovercheck

United States Patent Office 2,940,583
Patented June 14, 1960

2,940,583

CONVEYOR AND ACTUATING DEVICE THEREFOR

Charles L. Lovercheck, 632 W. 7th St., Erie, Pa.

Filed Mar. 19, 1956, Ser. No. 572,591

6 Claims. (Cl. 198—41)

This invention relates to conveyors and more particularly to conveyors for moving small articles of manufacture from a lower level to a higher level.

In the manufacture of parts from sub-assemblies made up of small parts which must be aligned, dressed, or moved to certain positions in order to be fed into or utilized in an automatic machine used in carrying out a manufacturing process, the parts feeder of the cylindrical bowl type having a channel track around the outside thereof is often used for this purpose. It has been common practice to move parts in such a conveyor by vibrating the bowls in a spiral path in order to move the parts in the bowls by centrifugal force around the outside of the bowl and up an inclined spiral path where certain parts may be returned which are turned in the wrong direction.

The present invention contemplates the use of a magnetic field, preferably a rotating magnetic field, for moving the articles of manufacture around the spiral track. In one embodiment of the invention, a three phase electric current is utilized for rotating the articles. The principle involved is similar to the principle involved in a rotating magnetic field in a multiphase electric motor wherein the magnetic poles rotate around a field in one direction. In this embodiment of the invention, separate electromagnets are connected in a particular manner around the bottom of the bowl of a conveyor in order to drive the articles up the incline. The bowl itself is preferably made of a plastic material which is non-conducting and non-magnetic. The bottom of the bowl could be slightly higher at the center than at the edges thereof to cause the parts to be inclined to slide by gravity toward the edges. The conveyor will convey magnetic articles by magnetic attraction and will convey non-magnetic articles by electrostatic action.

Another embodiment of the invention discloses how such a rotating magnetic field may be set up by using permanent magnets attached to a disk in a particular manner for moving the articles of manufacture up an incline. The disk is run at an inclination to the plane of the base supporting the conveyor and magnets are arranged around the outside of the disk and are also arranged in helical form at the center of the disk. The magnets may be either bar type magnets or horseshoe magnets with the ends of the horseshoe magnets terminating adjacent the conveyor.

It is, accordingly, an object of this invention to overcome the difficulties in prior parts feeders and conveyors and, more particularly, it is an object of this invention to provide a conveyor or parts feeder which is simple in construction, economical to manufacture, and simple and efficient in operation.

Another object of the invention is to provide a parts feeder or conveyor wherein a rotating magnetic field comprising spaced electromagnets arranged in spiral relation moves electrically conducted articles of manufacture up the conveyor.

A further object of the invention is to provide a conveyor wherein permanent magnets are supported on rotating disks beneath a conveyor track and are adapted to attract articles made of magnetic material and to repel articles of manufacture made of conducting non-magnetic material to move up the track.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

Fig. 3 is a diagrammatic view representing the electrical sine waves of the three phase electrical supply according to the invention;

Fig. 4 is a connection diagram showing how the magnets shown in Fig. 2 may be connected up in a three phase circuit to form a rotating magnetic field;

Fig. 5 is a vector diagram of the voltage relationship of a three phase voltage;

Fig. 6 is a schematic wiring diagram of a single phase electrical circuit adapted to be connected up to give the effect of a two phase circuit.

Fig. 7 is a vector diagram of the voltage which would be obtained from the wiring circuit shown in Fig. 6;

Fig. 8 is a connecting diagram showing how the electromagnets in Fig. 2 will be connected in a single phase circuit such as shown in Fig. 6;

Fig. 9 is a bottom view of a straight line trough type conveyor utilizing a rotating magnetic field such as shown in Fig. 2 but disposed in linear relation;

Fig. 10 is a side view of the conveyor shown in Fig. 9;

Figure 1:
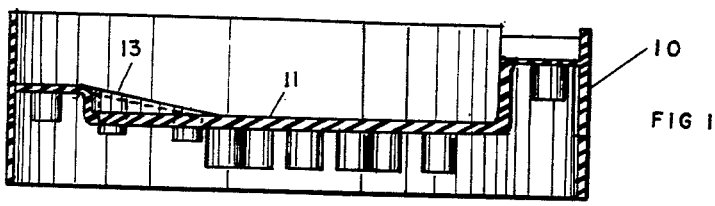
Fig. 1 is a cross sectional view of a conveyor according to the invention taken on line 1—1 of Fig. 2.
Figure 2:
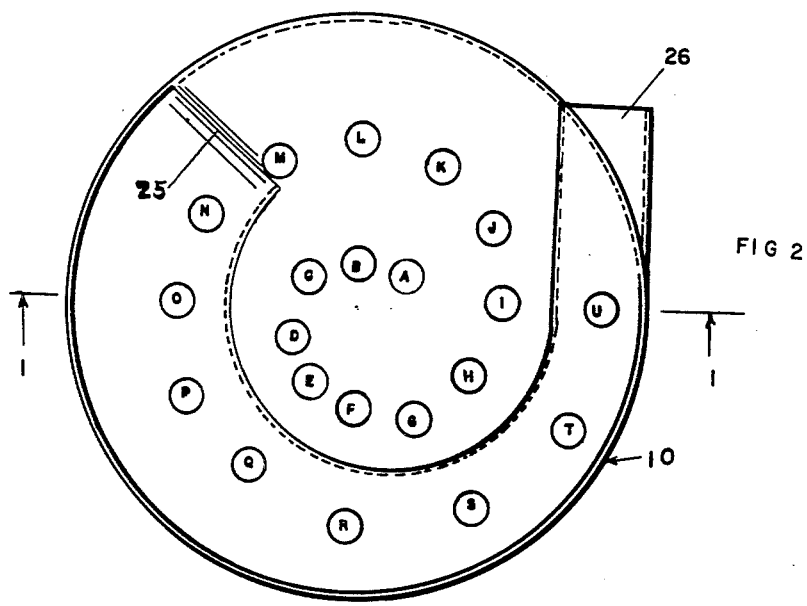
Fig. 2 is a bottom view of the conveyor shown in Fig. 1.

Now with more specific reference to the drawings, a conveyor is shown in Figs. 1 and 2 having a generally cylindrical outside portion 10 and a bottom 11 disposed intermediate the height thereof. The body of the conveyor may be molded of plastic and could be made of other suitable material. It could be made of non-magnetic metal or, in some applications, it will work better if made of a non-conduction non-magnetic material. The bottom 11 of the conveyor has a spiral track 13 disposed around the inside thereof having an input end 25 and an output end 26.

Solenoid electromagnets A, B, C . . . S, T, U are attached to the underside of the bottom 11 of the conveyor, preferably in the manner shown in Fig. 2. The magnets are connected along the line on which it is desired to have the parts move. The electromagnets may be connected to a three phase line in a manner to cause a rotating magnetic field; that is, to cause the magnets to be magnetized in groups such that, in effect, the field rotates. The magnets could be connected as shown in Fig. 4 which is the well known Y connection or they could be connected in the well known delta form of connection which is an equivalent to the connection shown in Fig. 4 and is familiar to those skilled in the art.

Connected to a three phase line, as is also well known, the phase relationship of the voltages are as shown in Fig. 3. Therefore, voltages E1, E2, and E3 are connected to wires 20, 21, and 22, respectively. The magnets will be magnetized A, D, G, J, M, P, S, and V first. Then the magnets B, E, H, K, N, Q, T, and W will be magnetized and then the magnets C, F, I, L, O, R, U, and X will be magnetized. Since the magnets are magnetized in a manner to effectively rotate the magnetic field around the conveyor in spiral form due to the electrical connections and the arrangement of parts, the parts in the conveyor, in the case of magnetic parts, will be attracted around the conveyor and in the case of non-magnetic parts, they will be repelled around the conveyor. Therefore, the polarity of the fields will be reverse.

Fig. 6 shows a single phase voltage E4—E5 adapted to be connected to a resistance inductance circuit or it could be connected to a resistance capacitor circuit to effectively give a ninety degree phase shift between the voltage across the inductance and the voltage across the capacitance; that is, the wire E4 is connected to the wire e4 in Fig. 8, the wire E5 is connected to the wire e5, and the wire E6 will be connected to the wire c6 in Fig. 8. The phase relationship of the voltage is as shown in Fig. 7 and the effects would be to magnetize alternate electromagnets periodically. This would give the effect of a rotating magnetic field. The magnets A, C, E, G, I, K, N, and O are first magnetized and then the magnets B, D, F, H, J, L, N, and P. Parts would thus be attracted from A to B, B to C, C to D, etc.

Fig. 9 shows another embodiment of the invention wherein electromagnets such as disclosed above are connected to a linear trough type feeder or conveyor. Multiphase electrical voltage is connected to the electromagnets, magnetizing them progressively in the manner of a rotating magnetic field stretched out.

In the above, the electromagnets could be made in any suitable manner and could be made in the form of a continuous stamped, laminated iron electromagnet such as the stator of a two or three phase electric motor or it could be made of U-shaped iron, the ends of the U's engaging the bottom of the conveyor.

Figure 12:
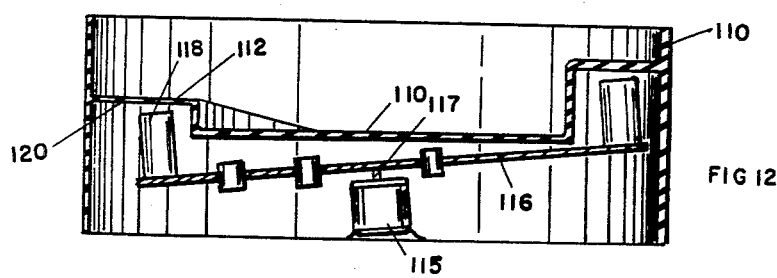
Fig. 12 is a cross sectional view taken on line 12—12 of Fig. 11.
Figure 11:
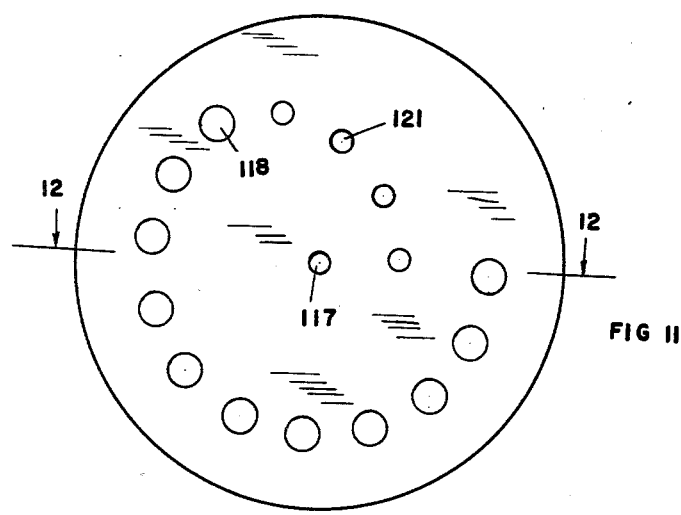
Fig. 11 is a bottom view of another embodiment of the invention.

In Figs. 11 and 12, another embodiment of the invention is shown wherein a container 110 has a bottom 111 therein formed with a spiral track 112 around the inside thereof. The underside 120 of the track 112 presents a spiral groove. The bottom of the conveyor is preferably made of non-magnetic material and may be, in some applications, a non-magnetic non-conducting material such as a molded formed plastic material, if desirable.

Supported below the conveyor is a motor 115 which has a disk 116 attached thereto and adapted to rotate with a motor shaft 117. Large permanent magnets 118 are attached at spaced points on the disk 116 and spiral permanent magnets 121 are attached in a generally spiral pattern; that is, some of them are closer to the center shaft 117 than others. The permanent magnets could be in the form of bar magnets as shown or they could be made in the form of horseshoe shaped permanent magnets with the ends of the horseshoe magnets facing upward, moving in a small clearance to the bottom of the conveyor.

It will be noted that the small magnets 121 are disposed to rotate at a close relationship to the flat portion of the bottom of the conveyor and the disk 116 is canted to one side. It will also be noted that the large permanent magnets 118 move in close relationship to the bottom of the spiral track 112 since the shaft 117 with the disk 116 thereon is canted and, therefore, the magnets and the disk 116 do not move in a plane parallel to the plane supporting the conveyor. As the disk 116 rotates, the magnets will attract magnetic articles and cause them to follow the magnets along the track 112 and will repel non-magnetic conducting articles such as copper articles due to the electrostatic field set up therein.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A conveyor for articles of manufacture comprising a support made of non-magnetic material and having a surface defining a helical path, spaced electromagnets attached to said support below said path and extending along said path, and alternating current means of at least two phases connected to said electromagnets to energize them progressively along said path whereby articles of electrical conductive material are advanced along said helical path.

2. A conveyor for articles of manufacture comprising a support having a surface made of non-magnetic material and extending in a helical path, spaced electromagnets fixed to the underside of said conveyor and disposed in a pattern to direct electrical conducting articles from one end of said conveyor to the other, and alternating current electrical means of at least two phases to energize said electromagnets whereby alternate said magnets are energized upon one cycle of said electrical means and other alternate said magnets are energized upon other cycles of said electrical means.

3. A conveyor for articles of manufacture comprising a support made of non-magnetic non-electrical conducting material having a hollow cylindrical side adapted to support articles, a spiral track attached to the underside of said cylindrical side, spaced electromagnets attached to said conveyor along said track, said track being adapted to support articles, and a multiphase alternating current source connected to said electromagnets to provide a rotating field whereby articles of electrical conducting properties supported on said track are advanced.

4. A parts feeder comprising an open top container having cylindrical sides and a bottom and made of non-magnetic material, a helical track disposed around the inside of said container, and spaced electromagnets attached to the underside of said bottom and said track, said magnets being connected to a source of electrical power in a manner to provide a rotating field whereby articles of manufacture are moved in a path in said container to an output end to be discharged therefrom.

5. A parts feeder comprising an open top container having cylindrical sides and a bottom and made of non-magnetic material, and spaced electromagnets attached to the underside of said bottom, said magnets being connected to a source of electrical power in a manner to provide a rotating field whereby articles of manufacture are moved in a path in said container to an output end to be discharged therefrom, said bottom being formed progressively upward around the peripheral edges to form a spiral form, some of said electromagnets being attached to the underside of said spiral whereby articles of electrical conducting material are moved up along said spiral.

6. The parts feeder recited in claim 5 wherein said electromagnets attached to said bottom are arranged in a helical path thereto.

References Cited in the file of this patent

UNITED STATES PATENTS

| | | |
|---|---|---|
| 1,051,056 | Bachelet | Jan. 21, 1913 |
| 1,616,280 | Prins | Feb. 1, 1927 |
| 2,144,835 | Dickinson | Jan. 24, 1939 |
| 2,790,534 | Spurlin | Apr. 30, 1957 |